(12) United States Patent  
Oohara

(10) Patent No.: US 7,542,434 B2  
(45) Date of Patent: Jun. 2, 2009

(54) COMMUNICATION APPARATUS MANAGING OTHER NODE AND COMMUNICATION APPARATUS MANAGED BY OTHER NODE

(75) Inventor: Kazuhiro Oohara, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 10 days.

(21) Appl. No.: 11/881,985

(22) Filed: Jul. 27, 2007

(65) Prior Publication Data

US 2007/0274319 A1    Nov. 29, 2007

Related U.S. Application Data

(62) Division of application No. 10/370,167, filed on Feb. 18, 2003, now Pat. No. 7,330,442.

(30) Foreign Application Priority Data

Feb. 20, 2002   (JP)   ............................. 2002-043588

(51) Int. Cl.  
*H04L 12/40* (2006.01)
(52) U.S. Cl. ........................ 370/257; 370/469
(58) Field of Classification Search ............... 370/257, 370/469  
See application file for complete search history.

(56) References Cited

U.S. PATENT DOCUMENTS

| | | | |
|---|---|---|---|
| 5,933,656 A | 8/1999 | Hansen | |
| 6,219,697 B1 | 4/2001 | Lawande et al. | |
| 6,226,762 B1 | 5/2001 | Foote et al. | |
| 6,237,049 B1 | 5/2001 | Ludtke | |
| 2003/0018819 A1 | 1/2003 | Fujimori | |
| 2003/0140154 A1* | 7/2003 | Fujimori | ............... 709/230 |
| 2005/0188132 A1 | 8/2005 | Takaku et al. | |

FOREIGN PATENT DOCUMENTS

| | | |
|---|---|---|
| EP | 1058422 | 12/2000 |
| EP | 1280311 | 1/2003 |
| JP | 06-104979 | 4/1994 |
| JP | 06-197112 | 7/1994 |
| JP | 08-008913 | 1/1996 |
| JP | 2000-151598 | 5/2000 |
| JP | 2001-053767 | 2/2001 |

* cited by examiner

*Primary Examiner*—Melvin Marcelo  
(74) *Attorney, Agent, or Firm*—Morrison & Foerster LLP

(57) ABSTRACT

A communication apparatus as a node of a communication network comprises a reading device that reads management information representing management status of a dominated node stored in the dominated node connected via the communication network, a writing device that writes identification information for managing the dominated node into the dominated node when the management information does not include identification information of other dominating node, and a management device that manages the dominated node. The communication apparatus is complied with the IEEE 1394 Standard and capable of managing the other nodes on the communication network.

23 Claims, 11 Drawing Sheets

COMMUNICATION APPARATUS MANAGING OTHER NODE AND COMMUNICATION APPARATUS MANAGED BY OTHER NODE

CROSS REFERENCE TO RELATED APPLICATION

This application is a divisional of U.S. patent application Ser. No. 10/370,167 filed Feb. 18, 2003, which in turn is based on Japanese Patent Applications 2002-043588, filed on Feb. 20, 2002, the entire contents of which are incorporated herein by reference.

BACKGROUND OF THE INVENTION

A) Field of the Invention

This invention relates to a communication apparatus that has a dominated node and a dominating node, and more specifically, a dominating node that can manage other node and a dominated node that is managed by the dominating node.

B) Description of the Related Art

IEEE 1394 Standard published by the Institute of Electrical and Electronics Engineers is known as a serial bus interface standard which can execute a voluminous and rapid digital data transmission. An interface based on the IEEE 1394 Standard or a device equipped with the interface (hereinafter both are called the IEEE 1394 device) is equipped with an IEEE 1394 bus protocol formed of hardware (a lower layer) that forms one node and protocols (an upper layer) such as a device control, an isochronous transmission control, etc. by means of software placed over the lower layer.

FIG. 12 is a schematic block diagram showing an example of protocol stack of a general audio visual (AV) device equipped with the mLAN™ (trade-mark) upper layer. The mLAN standard is connection management technology relating to a music data digital network for music performance data and audio data, the technology using the IEEE 1394 Standard and is an application located in the upper application.

The lower layer is, for example, constituted of each layer of a physical layer, a link layer, a transaction layer and a serial bus management.

The physical layer regulates the physical interface and the electric interface and is generally made of hardware. In the link layer, a one-way transmission service called sub-action and a packet handler that is a packet transmission/reception service are provided. The link layer is also generally made of hardware as same as the physical layer. In the link layer, for example, services concerning to the asynchronous transmission and the isochronous transmission are provided.

Also, especially in the isochronous transmission, since a signal that needs a rapid process such as an audio signal, a video signal and the like is managed, all the services are provided in the link layer that is hardware.

The transaction layer executes a process concerning to the asynchronous transmission. The transaction is a data transmission of a request-response type. There are three transaction types, namely, a read transaction, a write transaction and a lock transaction.

The read transaction is a transaction used for reading data from a specific target address space. The write transaction is a transaction used for writing data in a specific target address space. The lock transaction is a transaction used for renewing data in a specific target address space in accordance with reference data.

The bus management is a module for intensively managing resources on the serial bus. The bus management includes management of power supplies, management of a topology map and a speed map, management of isochronous resources, and the like.

The upper layer is software for managing the lower layer and the whole node, and is constituted of, for example, the 1394AV protocols (IEC-61883) and mLAN upper layer.

The AV protocols define a common isochronous packet (CIP) format for expressing the data contents of an isochronous packet, a connection management protocol (CMP) for managing connections by defining a virtual "plug", a function control protocol (FCP) for managing other devices connected to the IEEE 1394 bus, and the like.

The mLAN upper layer is a protocol layer for transmission of audio/music information in accordance with the IEEE 1394 standard. The mLAN upper layer is constituted of an audio/music information transmission protocol and a connection management protocol both complied with the 1394AV protocols.

The audio/music information transmission protocol is used for adding the format for transmitting audio/music information to the definition of CIP. The connection management protocol is used for performing autonomous connection management of each node by using an intelligent CMP.

All IEEE 1394 devices connected to an IEEE 1394 bus have the upper and lower layers although the functions thereof are different more or less. ▯@▯ @ The upper layer is more complicated than the lower layer. Therefore, hardware resources necessary for the upper layer increase more than the lower layer. The manufacture cost rises if the upper layer is used for all IEEE 1394 devices.

The upper layer is more relevant to a user interface than the lower layer. Therefore there are many chances of feeding back revision requests from users. Although it is desired that the upper layer has the structure easy to match a new specification, the manufacture cost rises if the structure of the upper layer of each of all IEEE 1394 devices is made easy to upgrade.

In a section of a preferred embodiment in Japanese Patent Application 2001-220895, the application being filed by the same applicant of the present application, it is suggested that other dominating node executes by proxy a function of the dominated node that does not have the upper layer. In the invention of Japanese Patent Application 2001-220895, a GUID of the dominating node to execute a function by proxy of the upper layer is written in a storage area of the dominated node. Therefore, a function of the dominated node can be used from other general node via the dominating node.

However, according to the above-described invention, when the dominating node that has the GUID written in the storage area does not response for some reason, other general node cannot use the dominated node.

Also, when the dominating node of a newer version participates in the network, and in the case that it is more effective for using the function of the dominated node when other dominating node executes it by proxy, other dominating node could not use the dominated node that is managed by other dominating node.

SUMMARY OF THE INVENTION

It is an object of the present invention to provide an apparatus complied with the IEEE 1394 Standard and capable of being manufactured at a low cost.

It is another object of the present invention to provide an apparatus complied with the IEEE 1394 Standard and capable of managing other nodes. ▯@▯@

Further, it is another object of the present invention to provide an apparatus complied with the IEEE 1394 Standard and capable of managing the node that is managed by other node temporarily.

According to one aspect of the present invention, there is provided a communication apparatus as a node of a communication network, comprising: a reading device that reads management information representing management status of a dominated node stored in the dominated node connected via the communication network; a writing device that writes identification information for managing the dominated node into the dominated node when the management information does not include identification information of other dominating node; and a management device that manages the dominated node.

According to another aspect of the present invention, there is provided a communication apparatus as a node of a communication network, comprising: a reading device that reads management information representing management status of a dominated node stored in the dominated node connected via the communication network; a requesting device that requests permission to manage the dominated node to other dominating node when the management information includes identification information of the other dominating node; and a management device that manages the dominated node in accordance with the permission of the other dominating node.

According to further aspect of the present invention, there is provided a communication apparatus as a node of a communication network, comprising: a reading device that reads management information representing management status of a dominated node stored in the dominated node connected via the communication network; a confirming device that confirms whether other dominating node is managing the dominated node or not when the management information includes identification information of the other dominating node; and a management device that manages the dominated node when the other dominating node is not managing the dominated node.

According to yet further aspect of the present invention, there is provided a communication apparatus forming one dominated node of a communication network, comprising: a lower layer that is managed by other node of the communication network and has a communication device that transmits/receives a signal to/from other node connected to the communication network; and a storage device that stores management information representing a management status of the lower layer.

According to still further aspect of the present invention, there is provided a communication system, comprising: a dominated node comprising
a lower layer that is managed by other node of the communication network and has a communication device that transmits/receives a signal to/from other node connected to the communication network, and a storage device that stores management information representing a management status of the lower layer; a first dominating node comprising a reading device that reads the management information stored in the dominated node connected via the communication network, a writing device that writes identification information for managing the dominated node into the dominated node when the management information does not include identification information of other dominating node, a management device that manages the dominated node, a request receiving device that receives a management request for managing the dominated node from other dominating node, and a responding device that responds to the other dominating node with permission to manage or rejection of the request in accordance with the received request; and a second dominating node comprising a reading device that reads the management information stored in the dominated node connected via the communication network, a requesting device that requests permission to manage the dominated node to the first dominating node when the management information includes identification information of the first dominating node, and a management device that manages the dominated node in accordance with the permission of the first dominating node.

According to the present invention, it is possible to provide an apparatus complied with the IEEE 1394 Standard and capable of being manufactured at a low cost.

According to the present invention, it is also possible to provide an apparatus complied with the IEEE 1394 Standard and capable of managing other nodes.

According to the present invention, it is also possible to provide an apparatus complied with the IEEE 1394 Standard and capable of managing the nodes that are managed by other nodes temporarily.

DETAILED DESCRIPTION OF THE PREFERRED EMBODIMENTS

Figure 1:
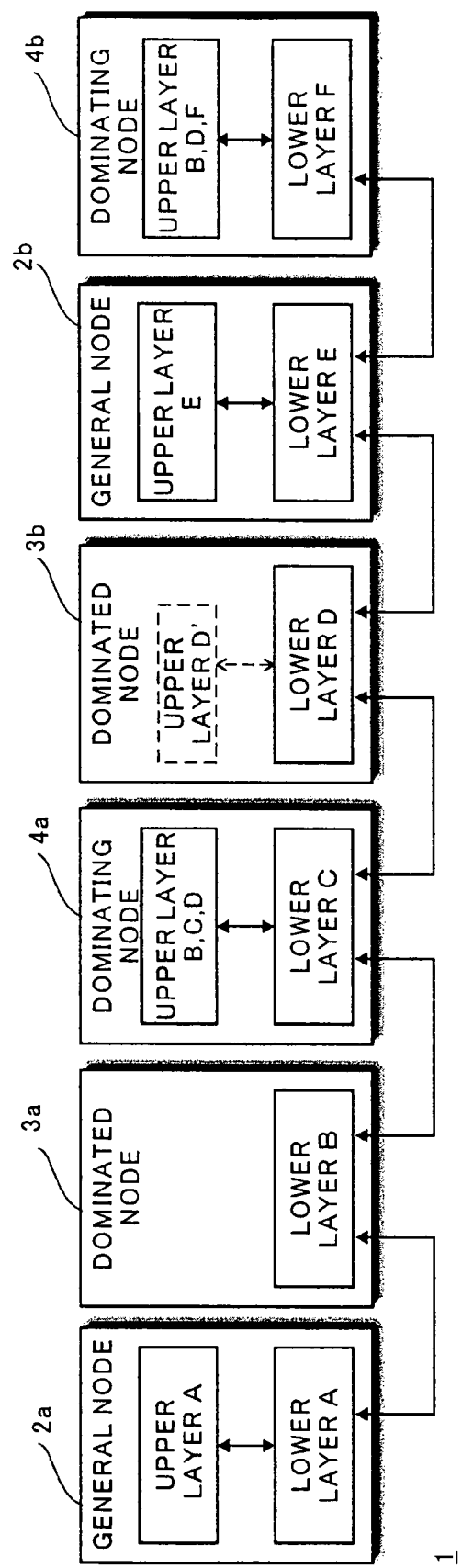
FIG. 1 is a block diagram showing an example of an IEEE 1394 bus 1 according to an embodiment of the present invention.

FIG. 1 is a block diagram showing an example of an IEEE 1394 bus 1 according to an embodiment of the present invention.

The IEEE 1394 bus 1 of the embodiment is structured by connecting, with IEEE 1394 cables, general nodes 2a and 2b with their upper and lower layers, a dominated node 3a without an upper layer, and a dominating node 4 (4a and 4b) with its upper and lower layers and upper layers of other nodes (e.g., upper layers of the dominated nodes 3a and 3b).

Each of the general nodes 2a and 2b may be one of an electronic musical instrument, an acoustic machine, an AV apparatus, a personal computer, an external storage device of various types and the like each having an IEEE 1394 interface. The general node 2a has the upper layer A and lower layer A, and the general node 2b has the upper layer E and lower layer E.

The dominated node 3a may be one of an electronic musical instrument, an acoustic machine, an AV apparatus, a personal computer, an external storage device of various types and the like each having an IEEE 1394 interface. For example, the dominated node 3a may be a powered speaker or the like. The dominated node 3a has no upper layer, but it is provided with only the lower layer B. Since the dominated node 3a does not have an upper layer, the dominated node 3a itself cannot normally communicate with the general node 2a or 2b by using a protocol defined by the upper layer.

Since the dominated node 3a is not provided with the upper layer, it cannot process by itself a command based upon the 1394AV protocol and a command based upon the mLAN standards which commands are generally processed by the upper layer. Since various transactions, isochronous transmission and the like are processed by the lower layer, the dominated node 3a itself can process them.

For example, if the dominated node 3a is a powered speaker, voice signals and the like to be reproduced are generally transmitted through isochronous transmission so that they can be processed only by the lower layer. However, connection setting of a reception channel, volume control and the like cannot be processed by the dominated node 3a itself with only the lower layer, because a command is received by the upper layer and the upper layer writes data in a function register (a hardware register in the lower layer) corresponding to the command by analyzing the command.

The dominated node 3a is a dominated node and stores an ID for identifying the type of an upper layer necessary for the dominating node that manages the dominated node into a Control and Status Registers (CSR) memory to be described later. The dominated node 3a also stores a Global Unique Identifier (GUID) of the dominating node currently managing the dominated node in the CSR memory.

The structure of the dominated node 3b is approximately the same as that of the dominated node 3a, excepting that the dominated node 3b has an upper layer D' and the lower layer D. The dominated node 3b may suspend the function of its upper layer D' to be managed by the upper layer D of the dominating node 4. The upper layer D' of the dominated node 3b may manage only some functions and missing functions may be managed by the upper layer D of the dominating node 4. Functions of the upper layer D' of the dominated node 3b can be executed or suspended in response to an external command.

Similar to the dominated node 3a, the dominated node 3b is a dominated node and stores an ID for identifying the type of an upper layer in the CSR memory, ID being necessary for the dominating node that manages the dominated node. If functions of the upper layer D' of the dominated node 3b are to be suspended, the dominated node 3b stores a GUID of the dominating node currently managing the dominated node in the CSR memory.

The dominating nodes 4a and 4b (hereinafter both or either one of the dominating nodes 4a and 4b are called the dominating node 4) may be one of an electronic musical instrument, an acoustic machine, an AV apparatus, a personal computer, an external storage device of various types and the like each having an IEEE 1394 interface. For example, the dominating node 4 is a personal computer having an external storage device. The dominating node 4 has the lower layer C (the lower layer F in the case of the dominating node 4b) and its upper layer C (the upper layer F in the case of the dominating node 4b) and in addition to the upper layers B and D for managing the lower layers of the dominated nodes 3a and 3b. These upper layers B and D are used as the proxies of the upper layers of the dominated nodes 3a and 3b so that the dominated node 3a or 3b can communicate with the general node 2a or 2b by using the protocol defined by the upper layer.

Figure 2:
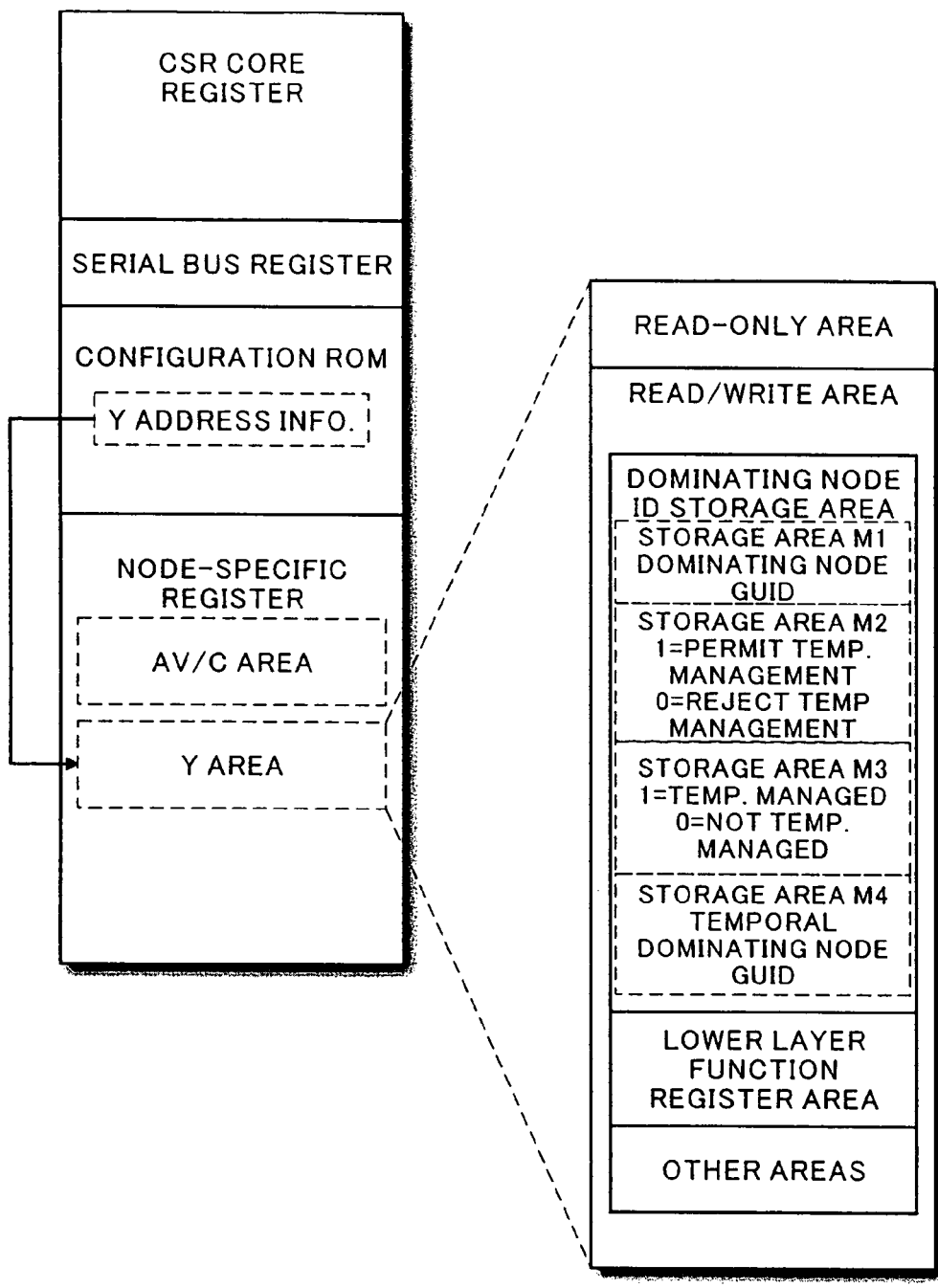
FIG. 2 is a conceptual diagram showing an example of a CSR memory of a dominated node 3a or 3b according to the embodiment of the present invention.

The dominating node 4 stores a GUID of a dominated node that the dominating node can dominate, in correspondence with software (upper layer) for managing the dominated node. FIG. 2 is a schematic diagram showing an example of a CSR memory of a dominated node 3a or 3b according to the embodiment of the present invention.

The CSR memory of the dominated node 3a or 3b is constituted of, for example, a CSR core register, a serial bus register, a configuration-ROM having Y address information, and node-specific registers having an AV/C area and a Y area.

The CSR core register and serial bus register have the structure similar to that of a known IEEE 1394 device. The Y address information is made public to other nodes (particularly the dominating node). The Y address information includes the addresses of a read-only area and a read/write area respectively in the Y area, and the addresses of a dominating node ID storage area, a lower layer function register area and other areas respectively in the read/write area.

The dominating node ID storage area is divided into storage areas M1 to M4.

In the storage area M1, a GUID of a dominating node that manages its own device (a dominated node) is stored. When there is no dominating node that manages its own device (the dominated node), a value "0" is stored. An initial value is "0". Also, contents in the storage area M1 may preferably be reserved at the time of power off.

The storage area M2 is a flag showing whether temporary management by a dominating node other than the dominating node stored GUID in the storage area M1 is possible or not. When the temporary management is possible, a value "1" is stored. When it is not possible, a value "0" is stored. The temporary management by a dominating node other than the dominating node stored GUID in the storage area M1 is possible for example, when the dominating node that the GUID is stored in the storage area M1 is in a state of power off or inactive, and when there is no dominating node on the same bus.

The storage area M3 is a flag showing whether its own device (the dominated node) is temporarily managed by the dominating node other than the dominating node stored GUID in the storage area M1 or not. When it is managed temporarily, a value "1" is stored, and when it is not, a value "0" is stored.

In the storage area M4, a GUID of a dominating node (hereinafter called a temporal dominating node) that manages its own device (the dominated node) temporarily is stored. When there is no temporal dominating node, a value "0" is stored, and an initial value is "0". Also, it may preferably be cleared at a time of power off.

The nodes (dominating nodes) stored the GUID in the storage area M1 or M4 read the Y address information, and can detect address of necessary register for managing the dominated node.

The GUID of the dominating node that manages its own device is stored in the storage area M1 or M4 to open to the public. Therefore, the dominating node that manages at the present time can be recognized, and a confliction of the dominating nodes can be prevented.

Also, the state (whether the dominated node is managed or not) of the dominated node at the present time is stored in the storage area M2 or M3 to open to the public. Therefore, the present state can easily recognized from other node.

Only a node whose GUID is stored in storage area M1 or M4 may be permitted to write data in a node-specific register. In this case, even if dominating nodes whose GUID's are not written in the dominating ID exist on the same bus, confliction between the dominating nodes can be prevented.

Figure 3:
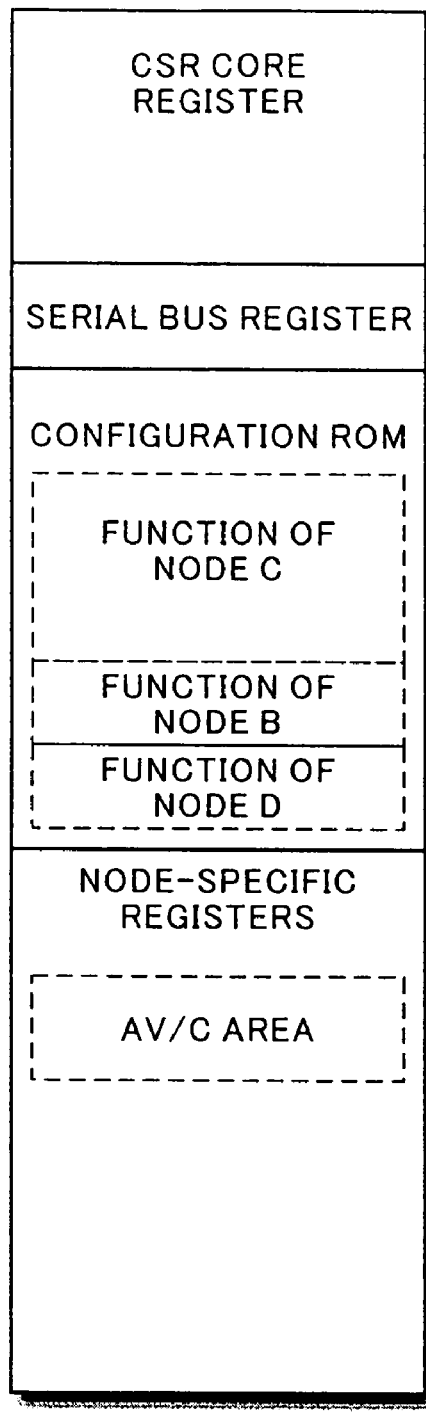
FIG. 3 is a schematic diagram showing an example of a CSR memory of a dominating node 4 according to the embodiment of the present invention.

Also, the dominating node ID storage area is provided in the Y area, and it may be provided in an area where reading/writing is possible from the dominating node. FIG. 3 is a schematic diagram showing an example of the CSR memory of the dominating node 4 according to the embodiment.

The CSR memory of the dominating node 4 is constituted of, for example, a CSR core register, a serial bus register, a configuration-ROM, and node-specific registers having an AV/C area.

The CSR core register and serial bus register have the structure similar to that of a known IEEE 1394 device. The structure of other parts is generally the same as that of the CSR memory of the dominated node 3a or 3b shown in FIG. 2.

The CSR memory of the dominating node 4 features in that it stores information of the dominating node in the configuration-ROM as well as function information of dominated nodes under management of the dominating node. Since the function information of each dominated node under management is stored in the configuration-ROM, the other node connected to the network interprets as if the dominating node features the functions of the dominated node.

Figure 4:
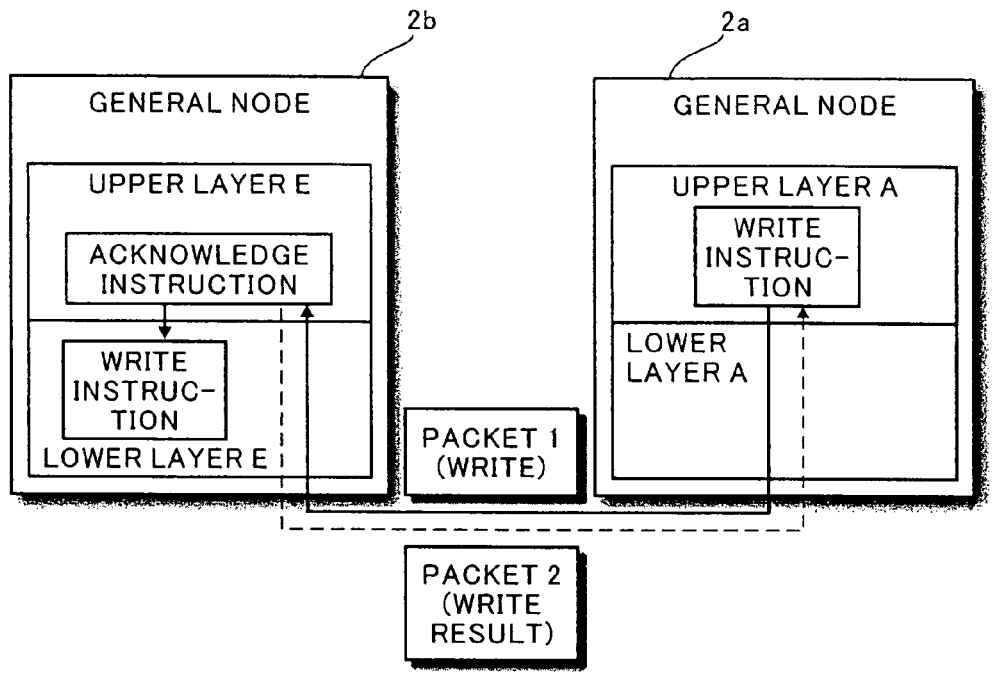
FIG. 4 is a block diagram showing communications between general nodes 2a and 2b.

FIG. 4 is a block diagram showing communications between the general nodes 2a and 2b. First, the general node 2b receives from the general node 2a (on the transmission side) a write-command instruction (packet 1) relative to an address corresponding to a function of the upper layer E. Next, in accordance with this write instruction, the lower layer E of the general node 2b (on the reception side) executes the write-command relative to the address corresponding to the function of the upper layer E.

Thereafter, the upper layer E of the general node 2b acknowledges the write instruction (packet 1) and supplies the lower layer E with the write instruction relative to a register (function register) corresponding to the command. Namely, the upper layer E analyzes the received command to allow control data corresponding to the contents of the command to be written in the register (function register) of the lower layer E corresponding to the function to be managed by the command. With the above-described operations, the lower layer E can perform the operation corresponding to the command transmitted from the general node 2a, in accordance with the control data written in the register.

After the control data is normally written, the lower layer E of the general node 2b transmits a packet 2 to the general node 2a, the packet 2 indicating that the write instruction was executed normally.

Figure 5:
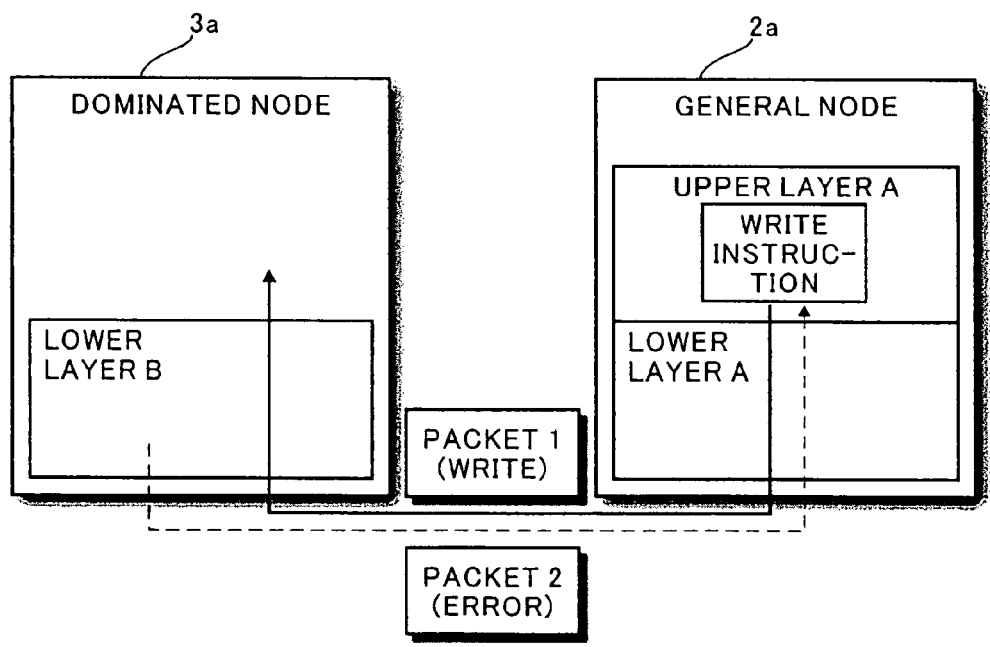
FIG. 5 is a block diagram showing communications between the general node 2a and dominated node 3a according to the embodiment of the present invention.

The nodes having the upper layer can manage each other by writing data in the function register via their own upper layers. FIG. 5 is a block diagram showing communications between the general node 2a and dominated node 3a according to the embodiment. In this example, it is assumed that the dominating node 4 is not connected to the IEEE 1394 bus 1.

The dominated node 3a receives, from the general node 2a (on the transmission side), a write-command instruction (packet 1) relative to the address corresponding to a function of the upper layer. In accordance with this write instruction, the lower layer B of the dominated node 3a (on the reception side) tries to execute the write-command. However, since the dominated node 3a is not provided with the upper layer, the address corresponding to the function of the upper layer does not exist. Therefore, the lower layer B transmits an error (packet 2) to the general node 2a. Namely, since the dominated node 3a is not provided with the upper layer, the write-command corresponding to the received packet 1 fails so that the control of the lower layer B corresponding to the command will not be performed.

Since the dominated node 3a returns the error relative to the command corresponding to the function of the upper layer, it can know that the dominated node 3a is not provided with the upper layer. In this embodiment, as shown in FIG. 6, the dominating node 4 is provided with the upper layer of the dominated node 3a and communicates with the general node 2a as a proxy of the dominated node 3a.

Figure 6:
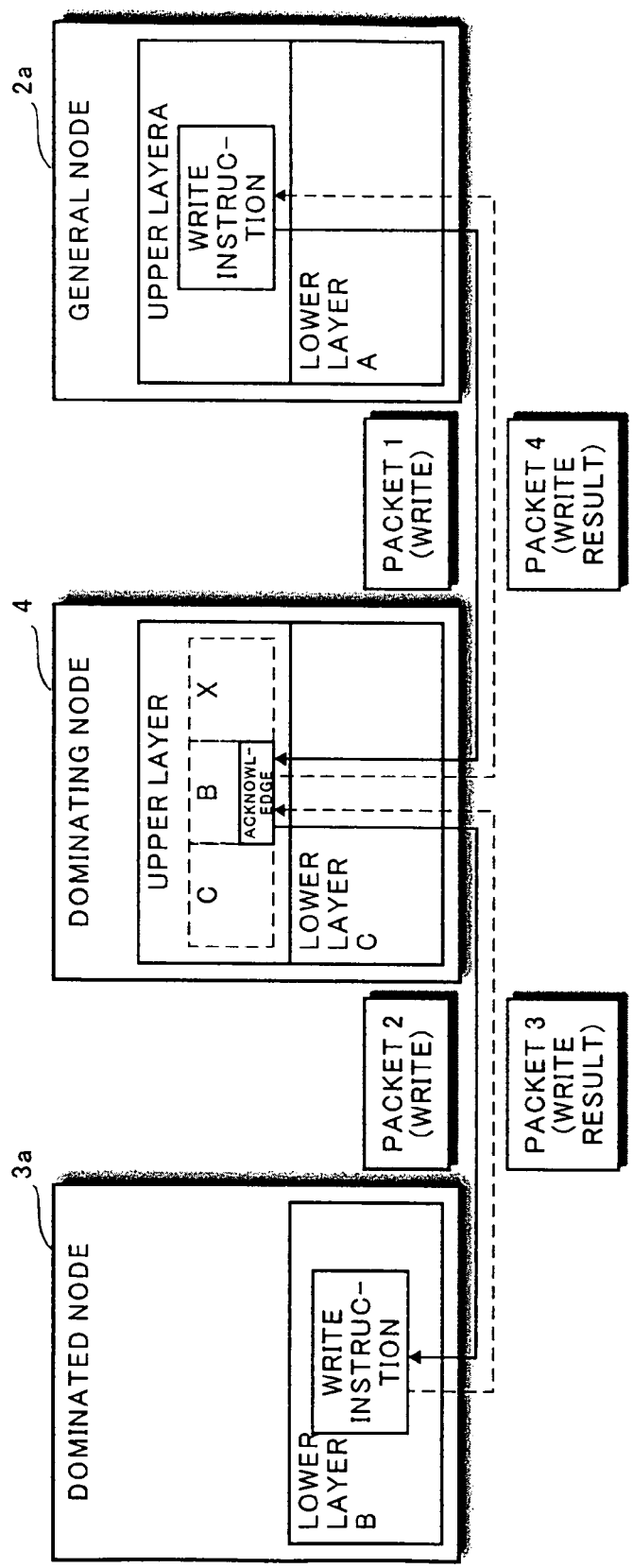
FIG. 6 is a block diagram showing communications between the general node 2a and dominated node 3a via the dominating node 4 according to the embodiment of the present invention.

FIG. 6 is a block diagram showing communications between the general node 2a and dominated node 3a via the dominating node 4 according to the embodiment. The dominating node 4 can manage the dominated node 3a because the dominating node 4 has already been set by a dominated node management setting process to be later described.

First, the lower layer C of the dominating node 4 receives from the general node 2a (on the commanding side) a write-command instruction (packet 1) relative to an address corresponding to a function of the upper layer B of the dominated node 3a.

Next, in accordance with the received write instruction, the lower layer C of the dominating node 4 writes a command relative to the address corresponding to the function of the upper layer B. Thereafter, the upper layer B detects the address of a function register of the lower layer B of the dominated node 3a corresponding to the function designated by the command. A write instruction (packet 2) for control data corresponding to the command relative to the detected address is transmitted to the dominated node 3a.

Thereafter, the lower layer B of the dominated node 3a executes the received write instruction (packet 2). Namely, the control data is written relative to the address corresponding to the function register of the lower layer B, and the process result (packet 3) is transmitted to the dominating node 4. In accordance with the written control data, the lower layer B executes an operation corresponding to the command transmitted from the general node 2a to the upper layer B of the dominating node 4.

Upon reception of the process result (packet 3) from the dominated node 3a, the dominating node transmits a response (packet 4) to the command to the general node 2a that is the commanding side and sent the command.

The general node 2a receives the response (packet 4) from the dominating node 4 and recognizes that the process was performed normally. The dominating node 4 becomes a proxy of the role that the upper layer of a dominated node originally plays. A signal to be processed at the upper layer is transmitted to the dominated node by using the format that the lower layer can process. In this manner, a write-command or the like relative to the dominated node without the upper layer can be performed.

Figure 7:
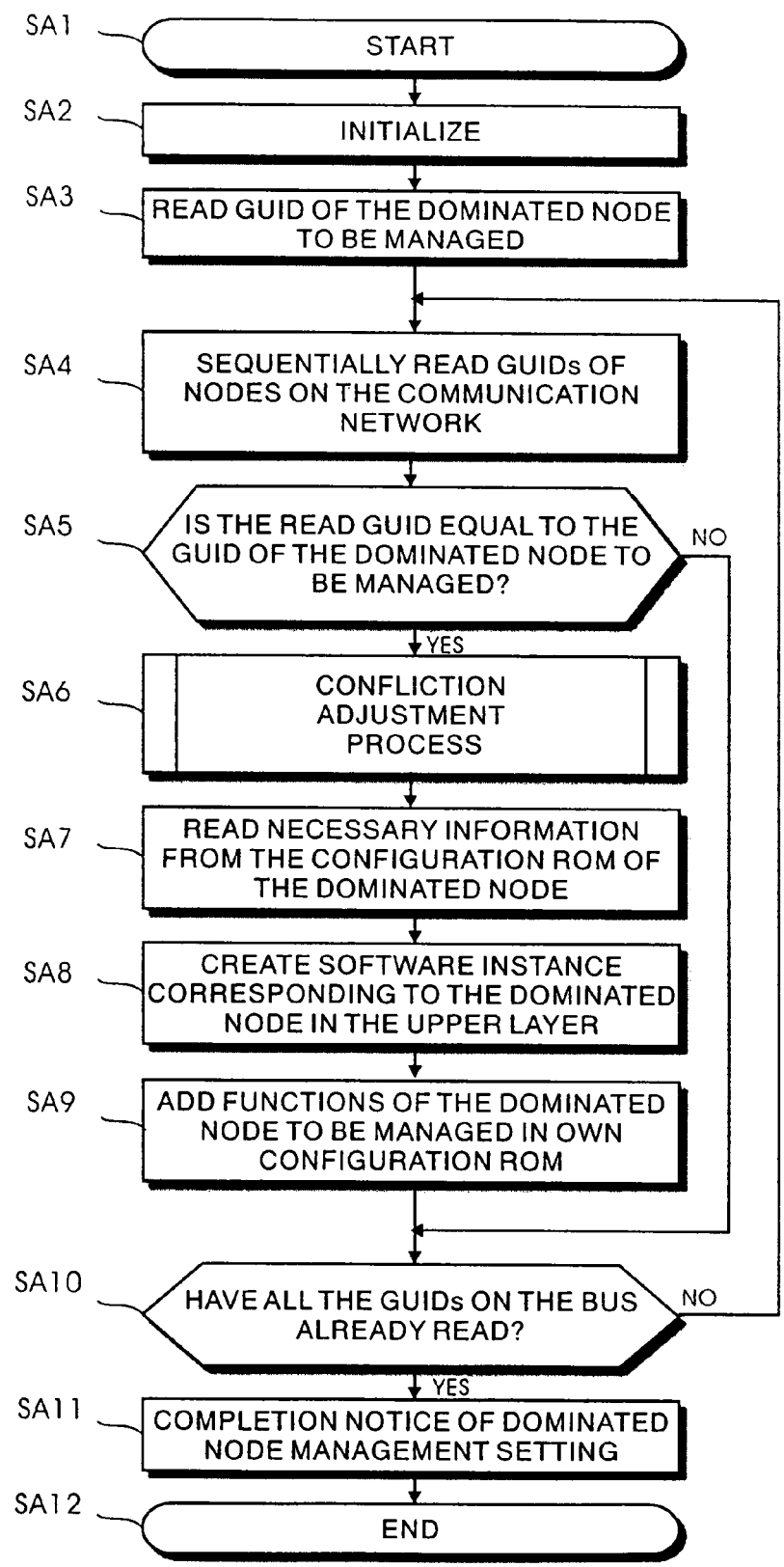
FIG. 7 is a flow chart showing a management setting process for dominated nodes to be executed by the dominating node 4 according to the embodiment of the present invention.

FIG. 7 is a flow chart showing a dominated node management setting process to be executed by the dominating node 4. This dominated node management setting process is activated each time a normal bus reset is executed. The bus reset occurs when the topology changes such as when a new node is connected to the bus and when the connected node is disconnected from the bus.

At Step SA1, the dominated node management setting process starts and the flow advances to the next Step SA2.

At Step SA2, the dominated node management setting process is initialized. Thereafter, the flow advances to the next Step SA3.

At Step SA3, GUID of each dominated node to be managed is read from a rewritable memory (e.g., the read/write area in FIG. 2). For the convenience of following description, it is assumed that the dominating node of this embodiment has already memorized one GUID of a dominated node in the rewritable memory. In a practical case, the dominating node may memorize one GUID, a plurality of GUID's or no GUID of the dominated node(s). GUID of the dominated node to be managed may be input by a user. GUID of the dominated node, which received the write instruction relative to the address corresponding to the function of the upper layer and returned the error as shown in FIG. 5, may be read from the configuration-ROM of the dominated node. After GUID of the dominated node to be managed is read, the flow advances to the next Step SA4.

At Step SA4, GUID of each node connected to the IEEE 1394 bus 1 is read. Although only one GUID is read by this Step SA4, GUID's of all nodes are will be read by repeating Step SA4. Thereafter, the flow advances to the next Step SA5.

At Step SA5, it is checked whether GUID read at Step SA3 of the dominated node to be managed is equal to GUID read at Step SA4. If equal, the flow advances to Step SA6 indicated by a YES arrow, whereas if not, the flow skips to Step SA10 indicated by a NO arrow.

At Step SA6, a confliction adjustment process described later is executed. The confliction adjustment process is a process for preventing a confliction between other dominating nodes in the management of the dominated node. Then the flow advances to the next Step SA7.

At Step SA7, necessary information for managing the dominated node is read from the configuration ROM of the dominated node that the GUID is agreed with a GUID of a dominated node to be managed at Step SA5. Then the flow advances to the next Step SA8.

At Step SA8, in accordance with the information read at Step SA7, a software instance (an upper layer of the dominated node to be managed) corresponding to the dominated node is created in the upper layer of the dominating node. Thereafter, the flow advances to the next Step SA9.

Creating the software instance corresponding to the dominated node is to set the state of the dominating node so as to allow the upper node of the dominating node to acknowledge the command (such as an AV/C command) that the upper layer of the dominated node should originally acknowledge. That is, after this process at Step SA8, the dominating node can acknowledge a command transmitted from another node to the dominated node under management of the dominating node.

At Step SA9, information of functions of the dominated node is additionally written in the configuration-ROM of the dominating node. It is therefore possible that another node can patent as if the dominating node has functions of the dominated node. Thereafter, the flow advances to the next Step SA10.

Functions corresponding to the upper layer of a dominated node to be managed among the upper layers prepared in advance by the dominating node are written in the configuration-ROM of the dominating node, but functions corresponding of the upper layer of a dominated node not to be managed are not written in the configuration-ROM.

At Step SA10, it is checked whether GUID's of all nodes connected to the IEEE 1394 bus 1 are read. If read, the flow advances to Step SA11 indicated by a YES arrow, whereas if not, the flow returns to Step SA4 indicated by a NO arrow to repeat the succeeding Steps.

At Step SA11, a completion notice of dominated node management setting is issued to other nodes in order to make the other nodes recognize that the dominated node is already managed. Thereafter, the flow advances to the next Step SA12 whereat the dominated node management setting process is terminated.

At Step SA11, a bus reset may be issued to make other nodes connected to the same IEEE 1394 bus 1 as that of the dominating node recognize the software instance created in the upper layer of the dominating node. In this case, the other nodes can patent as if there is a dominated node 3a with the upper layer.

Also, the dominating node can patent to have a function of the dominated node. A command corresponding to a function of the upper layer of the dominated node to be managed is transmitted to the dominating node.

The lower layer can directly process transmissions based on isochronous communications so that a command is directly transmitted to a dominated node without involving the dominating node. After the dominated node management setting process, the dominating node can process all accesses to the upper layer of a dominated node under management of the dominating node, and if necessary, can issue a predetermined transaction to a corresponding dominated node to confirm or change the operation state of the dominated node.

When a new dominated node is connected to the bus or when the connected dominated node is disconnected from the bus, the dominating node executes the process shown in FIG. 7 in response to the generated bus reset. In this case, functions of the new dominated node are written in the configuration-ROM of the dominating node, or functions of the disconnected dominated node are erased from the configuration-ROM.

Figure 8:
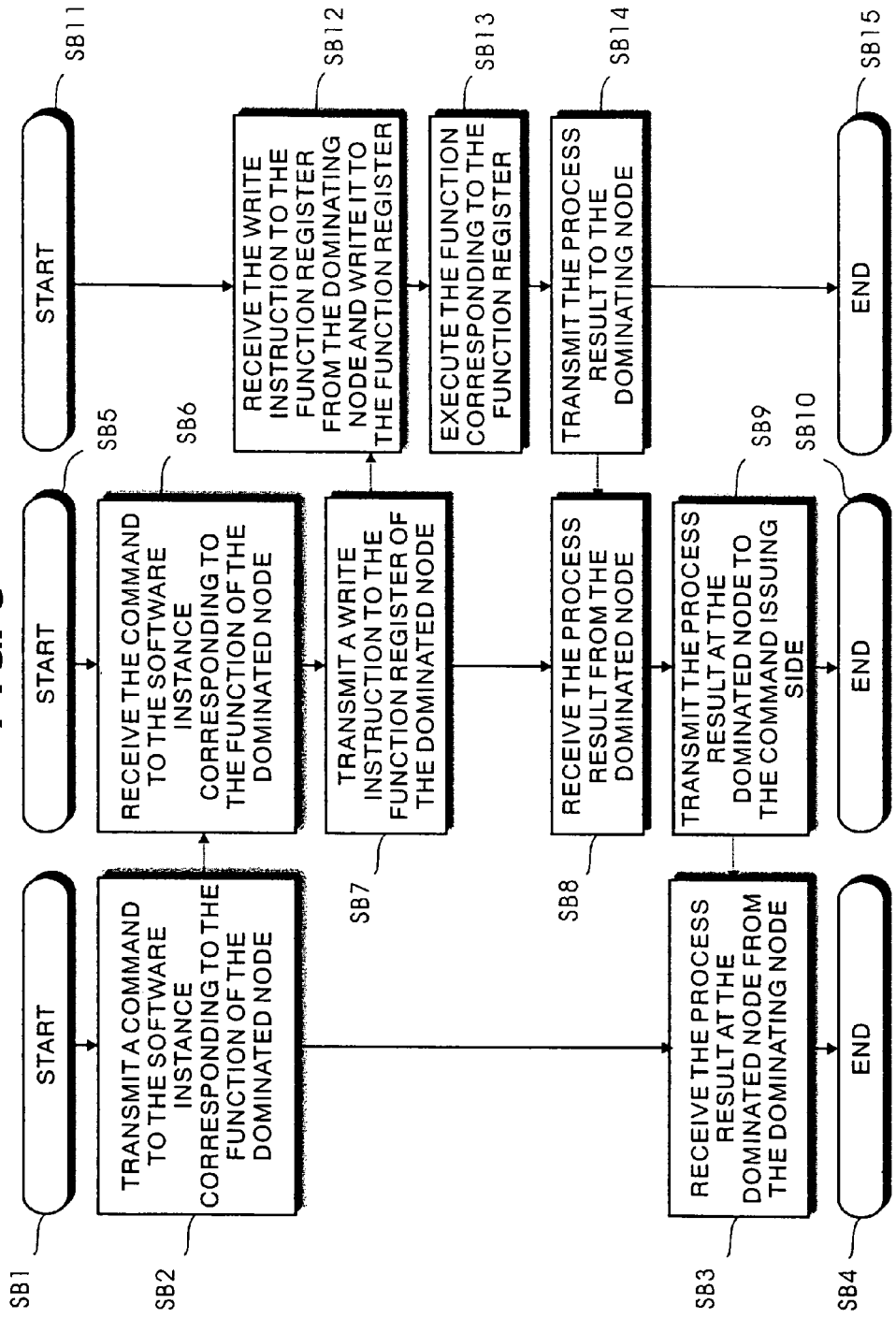
FIG. 8 is a flow chart showing a process of performing communications illustrated in FIG. 6 to be executed by each node.

FIG. 8 is a flow chart making easy to understand the concept of a process at each node during communications illustrated in FIG. 6. It is assumed that the dominating node has already executed the dominated node management setting process shown in FIG. 7. An arrow with a broken line shaft indicates a transmission of a packet.

Steps SB1 to SB4 are processes to be executed at a command issuing side (the general node 2a shown in FIG. 6). At Step SB1, the command issuing side process starts and the flow advances to the next Step SB2.

At Step SB2, a command for a software instance (the upper layer B of the dominating node 4 shown in FIG. 6) corresponding to a function of the dominated node is transmitted. Thereafter, the flow advances to the next Step SB3. The transmitted command is received by the dominating node at Step SB6 to be later described.

At Step SB3, the command issuing side receives a process result at the dominated node transmitted from the dominating node at Step SB9 to be described later. Thereafter, the flow advances to Step SB4 whereat the command issuing side process is terminated.

Steps SB5 to SB10 are processes to be executed at the dominating node (the dominating node 4 shown in FIG. 6). At Step SB5, the dominating node process starts and the flow advances to the next Step SB6.

At Step SB6, the dominating node receives the command for the software instance (the upper layer B of the dominating node 4 shown in FIG. 6) corresponding to the function of the dominated node and created in the upper layer of the dominating node. Thereafter, the flow advances to the next Step SB7.

At Step SB7, a write instruction is transmitted to the function register of the dominated node. Thereafter, the flow advances the next Step SB8. As described earlier, the dominating node stores the functions of each dominated node managed by the dominating node in the configuration-ROM. The dominating node also stores a variety of pieces of information for controlling each dominated node in a working memory of the dominating node. This information includes information of functions of each dominated node, an address of the function register of each dominated node corresponding to each function, and the like. The transmitted write instruction is received by the dominated node at Step SB12 to be described later.

At Step SB8, the dominating node receives the process result at the dominated node transmitted at Step SB14 to be described later. Thereafter, the flow advances to the next Step SB9.

At Step SB9, the process result at the dominated node received at Step SB8 is transmitted to the command issuing side. Thereafter, the flow advances to the next Step SB10 to terminate the dominating node process.

Steps SB11 to SB15 are processes to be executed by the dominated node (the dominated node 3a shown in FIG. 6).

At Step SB11, the dominated node process starts and the flow advances to the next Step SB12.

At Step SB12, the dominated node receives the write instruction to the function register transmitted from the dominating node at Step SB7, and writes control data in the function register. Transmission/reception of the write instruction and a process based on the write instruction are performed by the transaction layer of the lower layer. Therefore, these operations can be performed normally by the dominated node without the upper layer. Thereafter, the flow advances to the next Step SB13.

At Step SB13, a function corresponding to the function register is executed. For example, predetermined values or the like are written in the function register. Thereafter, the flow advances to the next Step SB14.

Figure 9:
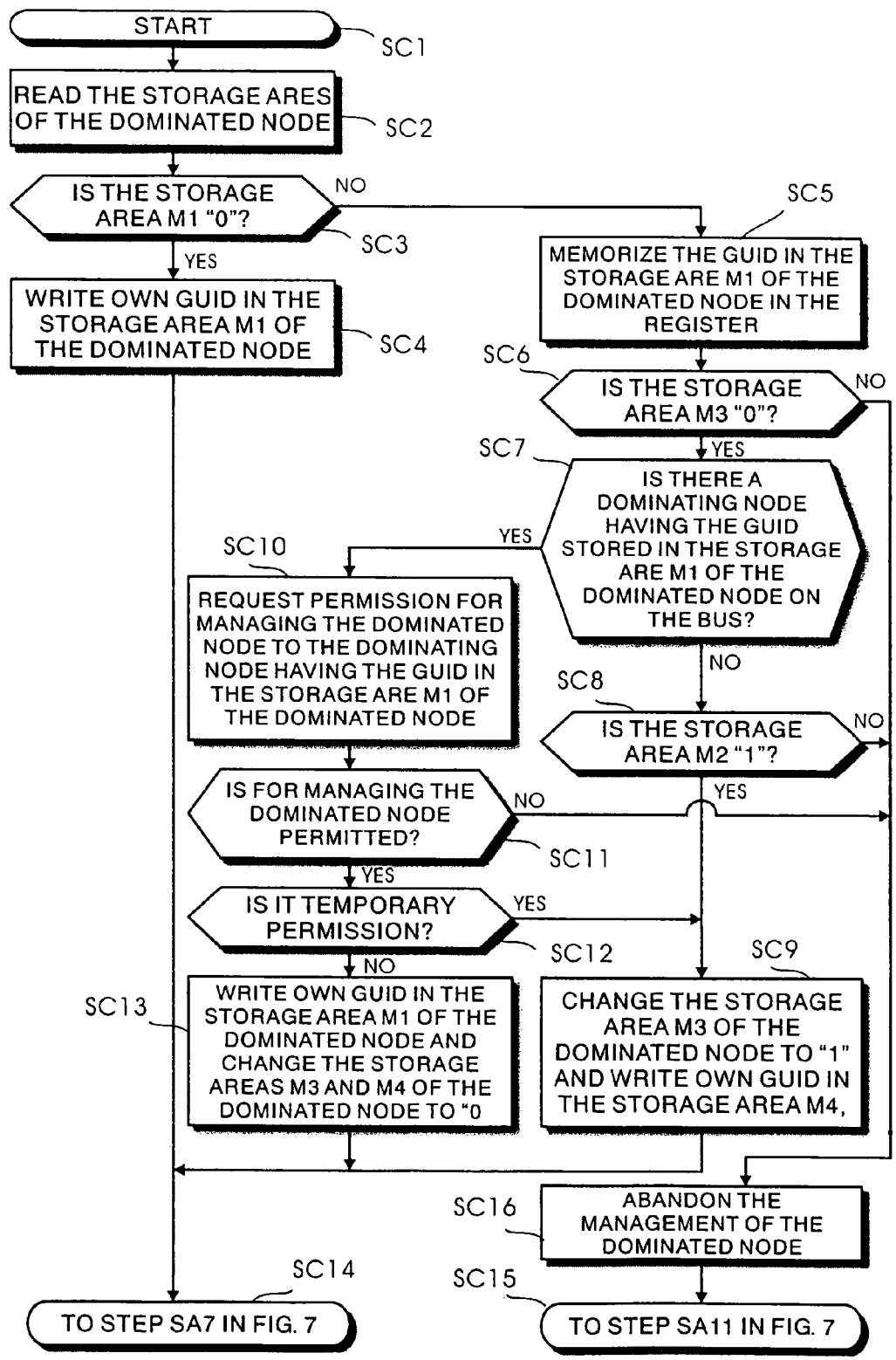
FIG. 9 is a flow chart showing a confliction adjustment process according to the embodiment of the present invention.
Figure 10:
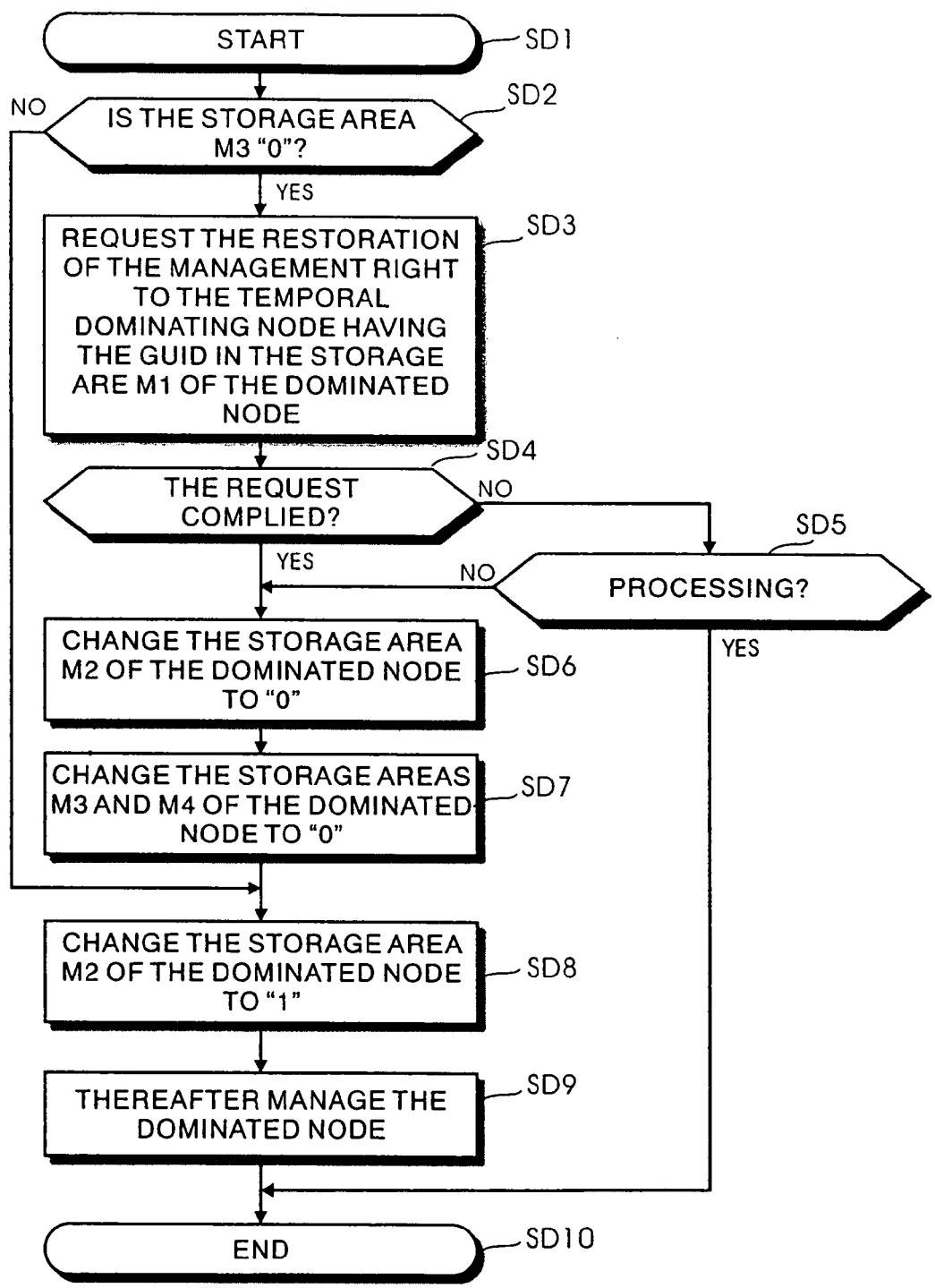
FIG. 10 is a flow chart showing a management right claiming process according to the embodiment of the present invention.

At Step SB14, the process result of the write instruction is transmitted to the dominating node. Thereafter, the flow advances to the next Step SB15 to terminate the dominated node process. FIG. 9 is a flow chart showing a confliction adjustment process according to the embodiment of the present invention. The confliction adjustment process is to adjust a confliction that can be occurred, for example when two or more than two dominating node which are on the same bus as shown in FIG. 1 (the dominating nodes 4a and 4b) manage one dominated node (dominated node 3a).

For example, in the case that there is the dominating node (for example, a mixer) on the bus already, other dominating node that is consisted of a computer with a higher performance and the like is connected. Then when the dominated node instead of the already existing dominating node is executed, the process is executed.

Also, for example, in the case that the dominating node that manages the dominated node is disconnected from the bus and that the power is turned off, the process is executed for managing the dominated node by other dominating node by bus reset issued at that time.

At Step SC1, the confliction adjustment process is started and the flow advances to the next Step SC2. At Step SC2, a storage area M1 (FIG. 2) of the dominated to be managed or to be desired is read. Then the flow advances to the next Step SC3.

At Step SC3, it is judged whether a value of the storage area M1 that is read at Step SC2 is "0" or not. When the value of the storage area M1 is "0", the flow advances to Step SC4 indicated by a YES arrow. When the value of the storage area M1 is not "0", that is, when a GUID of other dominating node is stored, the flow advances to Step SC5 indicated by a NO arrow.

At Step SC4, its own GUID is written in the storage area M1 of the dominated to be managed or to be desired is read. By that, starting of management of the dominated node can be informed to other dominating node. Then the flow advances to Step SC14.

At Step SC5, the GUID of the storage area M1 of the dominated node that is read at Step SC2 is memorized in the register. The GUID that is memorized in the register is used for a confirming process described later. Then the flow advances to the next Step SC6.

At Step SC6, the storage area M3 (FIG. 2) of the dominated to be managed or to be desired is read, and it is judged whether the value is "0" or not. When the value of the storage area M3 is "0", the flow advances to Step SC7 indicated by a YES arrow. When the value of the storage area M3 is not "0", that is, when the value of the storage area M3 is "1" and when other temporal dominating node manages temporarily, the flow advances to Step SC15 indicated by a NO arrow. Then management of the dominated node is abandoned.

At Step SC7, it is detected whether there is a dominating node that has a GUID stored in the storage area M1 of the dominated node on the bus or not. When there is the dominating node on the bus, the flow advances to Step SC10 indicated by a YES arrow. When there is not, the flow advances to Step SC8 indicated by a NO arrow.

At Step SC8, a value of the storage area M2 of the dominated node (FIG. 2) is read, and it is judged whether the value is "1" or not. When the value of the storage area M2 is "1", that is, when the dominated node is in a state of being possible of temporal management, the flow advances to Step SC9 indicated by a YES arrow. When the value of the storage area M2 is "0", that is, when the dominated node is in a state of being impossible of temporal management, the flow advances to Step SC15 indicated by a NO arrow. Then management of the dominated node is abandoned.

At Step SC9, the value "1" is written in the storage area M3 of the dominated node, and its own GUID is written in the storage area M4 (FIG. 2). Then it is informed to other node that the temporal dominating node manages the dominated node at the present time. Then the flow advances to Step SC14.

At Step SC10, permission for managing the dominated node is requested to the dominating node that has a GUID stored in the storage area M1 of the dominated node. When there is response from the dominating node that has a GUID stored in the storage area M1 of the dominated node, the flow advances to the next Step SC11.

At this time, the dominating node that is requested permission of management of the dominated node responses permission (temporal permission or complete permission) or rejection (prohibition) to the dominating node that is a requesting side. When the management of the dominated node is permitted, the dominating node requested permission of the management of the dominated node suspends management of the dominated node temporarily or completely.

The temporal permission is a permission that is given when restoration of a management right of the dominated node is requested by a management right claiming process described later without completely renouncing the right of management. The complete permission is a permission that is given when the management of the dominated node is not executed after giving a complete management right to the dominating node that is a requesting side when the dominating node requested for the allowance is changed to new one.

At Step SC11, it is judged whether the permission of the management of the dominated node is received from the dominating node that has a GUID stored in the storage area M1 of the dominated node or not. When the permission is obtained, the flow advances to Step SC12 indicated by a YES arrow. When the permission is not obtained, the flow advances to Step SC15 indicated by a NO arrow. Then management of the dominated node is abandoned.

At Step SC12, it is judged whether the permission of the management of the dominated node obtained from the dominating node that has a GUID stored in the storage area M1 of the dominated node is temporal permission or not. When it is temporal permission, the flow advances to Step SC9 indicated by a YES arrow. When it is not temporal permission, that is, when complete permission is obtained, the flow advances to Step SC13 indicated by a NO arrow.

At Step SC13, its own GUID is written in the storage area M1 of the dominated node, and the storage area M3 and M4 are cleared (a value "0" is written). By doing that, it is informed to be the dominating node that manages the dominated node thereafter to other node. Then the flow advances to the next Step SC14.

At Step SC14, the confliction adjustment process is terminated to return to Step SA7 as shown in FIG. 7, and the dominated node management is executed. At this time, the GUID of the storage area M1 of the dominated node stored at Step SC5 may be deleted from the register.

At Step SC15, the dominated node management is abandoned, and the flow advances to the next Step SC16. Then the confliction adjustment process is terminated to return to Step SA11 as shown in FIG. 7.

The management right claiming process is, for example, originally in the case that the dominating node 4a of FIG. 1 has a management right of the dominated node 3a, and in the case that the management right is temporarily given to the dominating node 4b by the above described confliction adjustment process or a later-described confirming process, the dominating node 4a that has original management right requests restoring of management right of the dominated node 3a.

At Step SD1, the management right claiming process is started, and the flow advances to the next Step SD2.

At Step SD2, a value of the storage area M3 of the dominated node to be desired restoration of the management right is read, and it is judged that whether the value is "1" or not. When the value of the storage area M3 is "1", that is, when the dominated node is managed by the temporal dominating node, the flow advances to Step SD3 indicated by a YES arrow. When the value of the storage area M3 is "0", the flow advances to Step SD9 indicated by a NO arrow.

At Step SD3, the GUID of the storage area M4 of the dominated node to be desired restoration of the management right is read, and restoration of management right of the dominated node is requested to the temporal dominating node that has the GUID. Then the flow advances to the next Step SD4.

At Step SD4, response from the temporal dominating node that has the GUID of the storage area M4 of the dominated node is received, and it is judges whether the request for restoration of the management right is complied or not. Also, if there is no response, it is judged that there is no dominating node 4b on the bus. Then the process is executed as the request of restoration is complied by compulsion. In the case that restoration of the management right is complied, the flow advances to Step SD6 indicated by a YES arrow. In the case that restoration of the management right is not complied for the reason that it takes time for a dominated node management releasing process for restoring, the flow advances to Step SD5 indicated by a NO arrow.

At Step SD5, it is judged whether the temporally dominating node having the GUID in the storage area M4 of the dominated node is currently the releasing process for the management of the dominated node. When it is executing the process, an estimated time of ending the process or the time period taking the process to be ended is requested to the dominating node, and the inquiry is executed again after the time or the time period elapses. Even if the process is being executed, however, when it is obvious to take a long time for ending that process or the process is still being executed after the time or the time period, this flow proceeds to Step SD10 as shown by an arrow marked "YES" to temporally terminating the management right restoration request process. When the process is not being executed or there is no response indicating the progress At Step SD6, a value "0" is written in the storage area M2 of the dominated node, and the dominated node is made to be into a state of temporally unavailable for being managed. Then the flow advances to the next Step SD6.

At Step SD8, a value "1" is written in the storage area M2 of the dominated node, and the dominated node is made to be into a state of temporally unavailable for being managed. Then the flow advances to the next Step SD9.

At Step SD9, the processes Step SA7 to SA9 are executed; thereafter the dominated node management is executed. Then the flow advances to the next Step SD10 to terminate the management right claiming process. However, the processes Step SD6 and SD8 may be omitted except when the temporal management by other node is permitted again.

Figure 11:
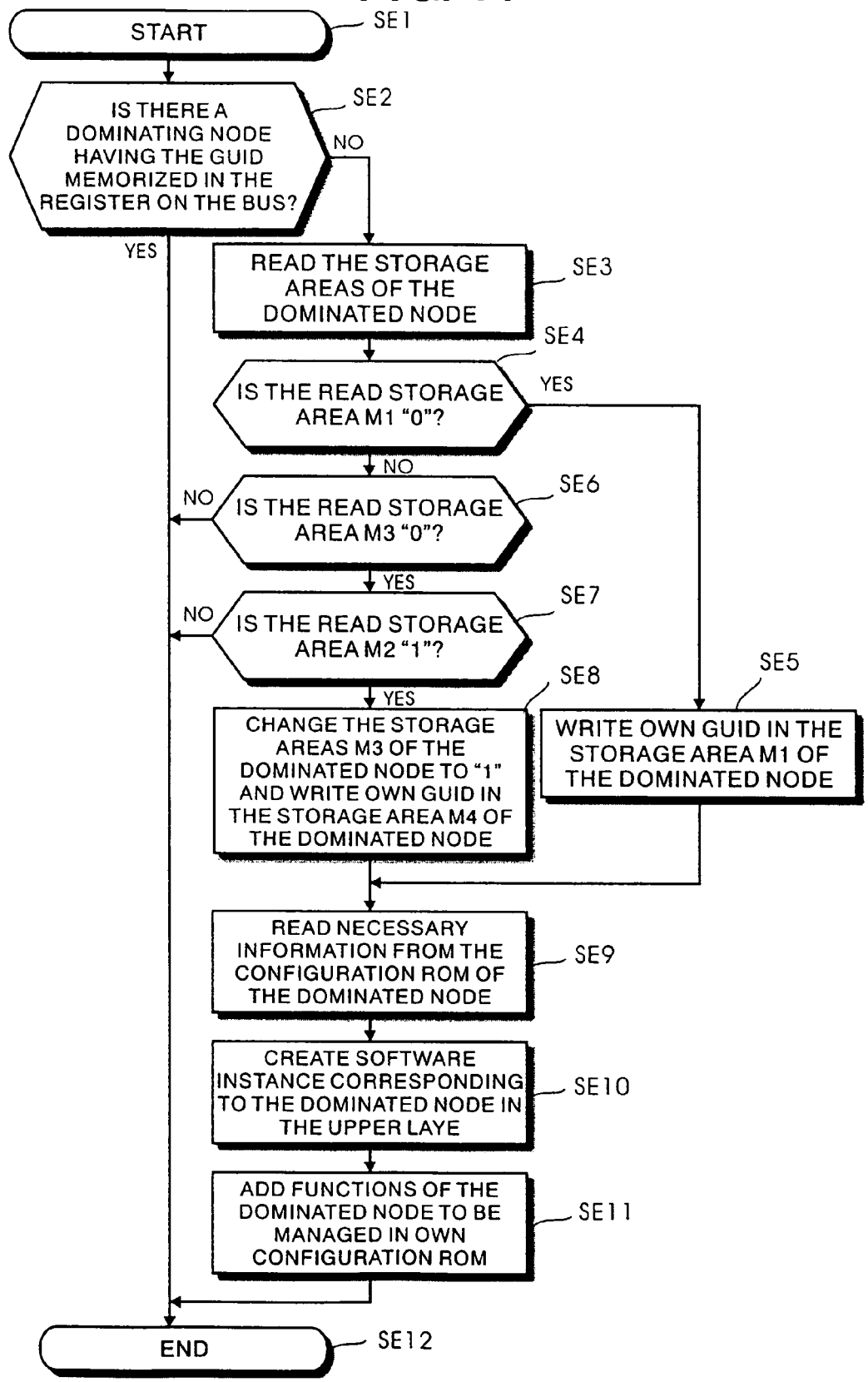
FIG. 11 is a flow chart showing a confirming process to other dominating node in the dominating node 4 according to the embodiment of the present invention.
Figure 12:
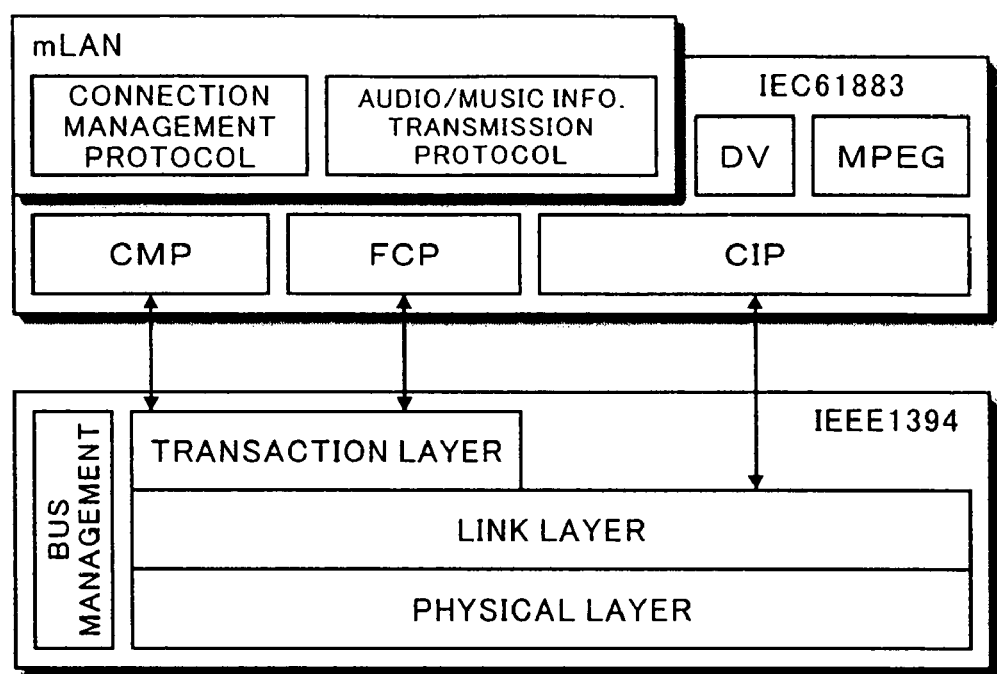
FIG. 12 is a schematic diagram showing an example of a protocol stack of a general audio/visual (AV) apparatus having an mLAN upper layer.

FIG. 11 is a flow chart showing a confirming process to other dominating node in the dominating node 4 according to the embodiment of the present invention. This confirming process is a process for confirming whether the dominating node that manages the dominated node at the present time (the dominating node that the GUID is written in the storage area M1 of the dominated node) normally manages the dominated node on the bus or not. Further, this process is executed by each dominated node.

By starting this confirmation process at a predetermined cycle, in the case that the dominating node 4b that manages the dominated node at present time can not execute the dominated node management for some reasons, for example, hung-up or freeze of the software, the dominated node can be temporarily managed instead of the present dominating node 4b. Therefore, even if there is a problem in the dominating node 4b that manages the dominated node at present time, a function of the dominated node can be used by a third node included the dominating node 4a.

At Step SE1, the confirming process is started, and the flow advances to the next Step SE2. Further, this confirming process is, for example, an interrupt process booted at regular intervals such as at one-second intervals in the case that the GUID of other dominating node is stored in the register.

At Step SE2, it is judged whether there is a dominating node that has the GUID stored in the register at Step SC5 in FIG. 9 or not. That is, it is confirmed whether the node normally response or not. When there is on the bus, the flow advances to Step SE12 indicated by a YES arrow to terminate the confirming process.

The processes Step SE3 to SE5 are the same as the processes Step SC2 to SC4 in FIG. 9.

The process of Step SE6 is the same process as Step SC6 in FIG. 9, and the processes of Step SE7 and SE8 are the same processes as Step SC8 and SC9 in FIG. 9.

The processes Step SE9 to SE11 are the same as the processes Step SA7 to SA9 in FIG. 7. Then the flow advances to Step SE12 to terminate the confirming process.

Further, after Step SE11, the GUID stored in the register may be deleted.

According to the embodiment, an IEEE 1394 device serving as a dominating node can manage an apparatus (dominated node) complied with the IEEE 1394 Standard and without the upper layer A single dominating node can manage a plurality of dominated nodes. It is therefore easy to update the upper layer complied with the IEEE 1394 Standard such as a user interface, without updating each apparatus separately and independently. Updating includes not only "updating an upper level protocol" but also "fixing bugs" and "improving the performance".

Since the upper layer is implemented in the dominating node, a node without the upper layer can be realized while maintaining compatibility with the upper layer complied with the IEEE 1394 Standard.

Also, an IEEE 1394 device corresponding to a general node can therefore control the dominated node via the dominating node.

Since the upper layer is omitted from the dominated node, hardware and software resources necessary for the upper layer can be omitted, and the dominated node can be manufactured at a low cost.

Even if some or all of the functions of the upper layer of a dominated node are suspended, the dominated node can be managed by the dominating node. In this case, updating the upper layer of the dominating node is equivalent to updating the upper layer of the dominated node.

Even if the upper layer is defined by new IEEE 1394 Standard, the dominated node can be made complied with the new IEEE 1394 Standard only by updating the upper layer of the dominating node.

If the dominating node is a personal computer or the like capable of executing a plurality of software pieces (upper layers) for managing dominated nodes, GUID of the dominated node managed by each software piece is managed and stored. In this manner, it becomes possible to avoid contention such as managing one dominated node by a plurality of software pieces.

Also, according to the embodiment of the present invention, in the case that there is plurality of dominating nodes on the same bus, the confliction between the dominating nodes can be prevented by inquiring whether management is possible or not to the dominated node.

Also, in the case that the dominating node under managing is in a non-active state, or in the case that there is not on the bus, other dominating node can temporarily manage the dominated node by inquiring to the dominated node.

Also, according to the embodiment of the present invention, since the GUID of the dominating node that manages at present time in the dominated node is recorded, the dominating node that desires the dominated node management can prevent conflictions by requesting the dominated node management to the dominating node that has the GUID recorded in the dominated node.

Also, according to the embodiment of the present invention, in the case that the dominating node under managing becomes to be unable to manage the dominated node normally for some reasons, for example, the dominated node can be managed temporarily by other dominating node by the above-described confirming process.

Moreover, according to the embodiment of the present invention, however, only the dominating node can clear (a value "0" is written) the storage area of the dominated node, the dominated node itself may preferably clear the storage area. Even if the dominating node that the GUID is stored in the storage area does not connect to the same bus by keeping the management right of the dominated node, other dominating node can obtain the management right by clearing the storage area by the dominated node itself.

The functions of the embodiment may be realized by a commercially available computer installed with a computer program and the like realizing the embodiment functions.

In such a case, computer readable storage media such as a CD-ROM and a floppy (trade-mark) disk storing the computer program and the like realizing the embodiment functions may be supplied to users.

If a computer is connected to a communication network such as a LAN, the Internet and telephone lines, the computer program and the like may be supplied via the communication network.

The present invention has been described in connection with the preferred embodiments. The invention is not limited only to the above embodiments. It is apparent that various modifications, improvements, combinations, and the like can be made by those skilled in the art.

The invention claimed is:

1. A communication apparatus constituting one node having a layered structure consisting of at least a first lower layer having a first register, a first upper layer that manages the first lower layer and a second upper layer that manages a second lower layer of a specific dominated node connected to a network, wherein an operation of the first lower layer is controlled by data stored in the first register, the apparatus comprising:

a communication device included in the lower layer of said node that transmits/receives a signal to/from another node which is connected to the network and generates a first instruction and a second instruction;

a first generating device included in the upper layer that generates a first control signal in accordance with the first instruction received from said another node via the network;

a first writing device that writes the first control signal to the first register to control the operation of the first lower layer;

a management information reading device that reads management information representing management status of a dominated node stored in the dominated node connected via the network; and a management information writing device that writes identification information of the one node into a storage area of the management information in the dominated node via the network when the management information does not include identification information of other dominating node, and when the identification information of the one node is written into the dominated node as a part of the management information, the communication apparatus operates as a proxy of the specific dominated node, and the communication apparatus further comprises:

a second generating device included in the second upper layer that generates a second control signal for controlling the second lower layer of the specific dominated node in accordance with the second instruction received from said another node via the network; and a second writing device that writes the second control signal to a second register of the second lower layer of the specific dominated node via the network to control the operation of the second lower layer.

2. A communication apparatus according to claim 1, further comprising:

a request receiving device that receives a request for permission for managing the specific dominated node from other dominating node via the network; and a responding device that responds to the other dominating node via the network with permission to manage or rejection of the request in response to the received request, wherein the communication apparatus pauses the operation as a proxy of the specific dominated node when the responding device responds to the other dominating node with permission to manage.

3. A communication apparatus according to claim 2, further comprising a restoration requesting device that requests restoration of a management right of the dominated node to the other dominating node after the responding device responds to the other dominating node with permission to manage.

4. A communication apparatus according to claim 2, wherein the permission to manage is either temporal permission or complete permission.

5. A communication apparatus according to claim 1, further comprising:

a requesting device that requests permission to manage the dominated node to other dominating node when the management information includes identification information of the other dominating node, and wherein the management information writing device writes the identification information of the one node into the dominated node when the communication apparatus receives the permission from the other dominating node.

6. A communication apparatus according to claim 5, wherein the permission received is temporal permission and the management information writing device writes the identification information to a storage area of the dominated node different from a storage area where the identification information of the other dominating node is written.

7. A communication apparatus according to claim 6, wherein the other dominating node requests restoration of management right to the communication apparatus after the other dominating node responses to the temporal permission.

8. A communication apparatus according to claim 5, wherein the permission received is complete permission and the management information writing device overwrites the identification information to a storage area of the dominated node where the identification information of the other dominating node has been written.

9. A communication apparatus according to claim 1, further comprising:

a confirming device that confirms whether the other dominating node is managing the dominated node or not when the management information includes identification information of the other dominating node, and wherein the management information writing device writes the identification information of the one node into the dominated node when the other dominating node is not managing the dominated node.

10. A communication apparatus according to claim 9, wherein the confirming device starts the confirmation at regular intervals when the management information includes identification information of the other dominating node.

11. A communication apparatus according to claim 9, further comprising judging device that judges whether temporary management of the specific dominated node is possible or not based on the management information, and wherein the management information writing device writes the identification information of the one node to a storage area of the dominated node different from a storage area where the identification information of the other dominating node is written when the temporary management is possible and does not write the identification information when the temporary management is not possible.

12. A communication apparatus according to claim 1, further comprising a storage device that stores information about functions of the specific dominated node when the communication apparatus operates as a proxy of the specific dominated node.

13. A communication apparatus as a dominated node connected to a network, having a layered structure consisting of at least a lower layer having a register, wherein an operation of the lower layer is controlled by data stored in the register, the apparatus comprising:

a communication device included in the lower layer of said node that transmits/receives a signal to/from other nodes connected to the network and generates an instruction; and a storage device that stores management information representing a management status of the lower layer device, wherein the management information includes first data representing a dominating node and second data concerning to a temporary management, and when the second data indicates that the dominated node is not temporarily managed by other dominating node, the dominating node having an upper layer operates as a proxy of the dominated node, wherein the dominating node generates the control signal in accordance with the instruction and writes the control signal to the register via the network, and when the second data indicates that the dominated node is temporarily managed by other dominating node, the other dominating node having an upper layer operates as a proxy of the dominated node instead of the dominating node.

14. A communication apparatus according to claim 13, wherein the second data includes a flag showing whether temporary management by the other dominating node is possible or not.

15. A communication apparatus according to claim 13, wherein the second data includes a flag showing whether the dominated node is temporary managed by the other dominating node or not.

16. A communication apparatus according to claim 13, wherein the second data includes identification information of the other dominating node which operates as a proxy of the dominated node instead of the dominating node.

17. A communication system, comprising:

a dominated node connected to a network, having a layered structure consisting of at least a lower layer having a register, wherein an operation of the lower layer is controlled by data stored in the register, the apparatus comprising: a communication device included in the lower layer of said node that transmits/receives a signal to/from other nodes connected to the network and generates an instruction; and a storage device that stores management information representing a management status of the lower layer device, wherein the management information includes first data representing a dominating node and second data concerning to a temporary management, and when the second data indicates that the dominated node is not temporarily managed by other dominating node, a first dominating node having an upper layer operates as a proxy of the dominated node, wherein the first dominating node generates the control signal in accordance with the instruction and writes the control signal to the register via the network, and when the second data indicates that the dominated node is temporarily managed by a second dominating node, the second dominating node having an upper layer operates as a proxy of the dominated node instead of the first dominating node;

the first dominating node having a layered structure consisting of at least a first lower layer having a first register, a first upper layer that manages the first lower layer and a second upper layer that manages a second lower layer of the dominated node connected to the network, wherein an operation of the first lower layer is controlled by data stored in the first register, the apparatus comprising: a communication device included in the lower layer of said node that transmits/receives a signal to/from other node connected to the network and generates a first instruction and a second instruction; a first generating device included in the upper layer that generates a first control signal in accordance with the first instruction received from said other node via the network; a first writing device that writes the first control signal to the first register to control the operation of the first lower layer; a management information reading device that reads the management information representing management status of the dominated node stored in the dominated node connected via the network; and a management information writing device that writes identification information of the first dominating node into the storage area of the management information in the dominated node via the network when the management information does not include identification information of other dominating node, and when the identification information of the first dominating node is written into the dominated node as a part of the management information, the first dominating node operates as a proxy of the dominated node, and the first dominating node further comprises: a second generating device included in the second upper layer that generates a second control signal for controlling the lower layer of the dominated node in accordance with the second instruction received from said other node via the network; a second writing device that writes the second control signal to a second register of the second lower layer of the specific dominated node via the network to control the operation of the second lower layer; a request receiving device that receives a request for permission for managing the dominated node from a second dominating node via the network; and a responding device that responds to the second dominating node via the network with permission to manage or rejection of the request in response to the received request, wherein the first dominating node pauses the operation as a proxy of the dominated node when the responding device responds to the second dominating node with permission to manage;

and the second dominating node having a layered structure consisting of at least a first lower layer having a first register, a first upper layer that manages the first lower layer and a second upper layer that manages a second lower layer of the dominated node connected to the network, wherein an operation of the first lower layer is controlled by data stored in the first register, the apparatus comprising: a communication device included in the lower layer of said node that transmits/receives a signal to/from other node connected to the network and generates a first instruction and a second instruction; a first generating device included in the upper layer that generates a first control signal in accordance with the first instruction received from said other node via the network; a first writing device that writes the first control signal to the first register to control the operation of the first lower layer; a management information reading device that reads the management information representing management status of the dominated node stored in the dominated node connected via the network; a requesting device that requests permission to manage the dominated node to the first dominating node when the management information includes identification information of the first dominating node; and a management information writing device that writes identification information of the second dominating node into the storage area of the management information in the dominated node via the network when the second dominating node receives the permission from the first dominating node.

18. A communication method for one node having a layered structure consisting of at least a first lower layer having a first register, a first upper layer that manages the first lower layer and a second upper layer that manages a second lower layer of a specific dominated node connected to a network, wherein an operation of the first lower layer is controlled by data stored in the first register, the method comprising the steps of:

(a) transmitting/receiving a signal to/from another node which is connected to the network and generating a first instruction and a second instruction;

(b) generating a first control signal in accordance with the first instruction received from said another node via the network;

(c) writing the first control signal to the first register to control the operation of the first lower layer;

(d) reading management information representing management status of a dominated node stored in the dominated node connected via the network; and (e) writing identification information of the one node into a storage area of the management information in the dominated node via the network when the management information does not include identification information of other dominating node, and when the identification information of the one node is written into the dominated node as a part of the management information, the one node operates as a proxy of the specific dominated node, and the communication method further comprises the step of:

(f) generating a second control signal for controlling the second lower layer of the specific dominated node in accordance with the second instruction received from said another node via the network; and (g) writing the second control signal to a second register of the second lower layer of the specific dominated node via the network to control the operation of the second lower layer.

19. A communication method according to claim 18, further comprising the step of:

(h) requesting permission to manage the dominated node to other dominating node when the management information includes identification information of the other dominating node, and wherein the step (e) writes the identification information of the one node into the dominated node when the permission from the other dominating node is received.

20. A communication method for a dominated node connected to a network, having a layered structure consisting of at least a lower layer having a register, wherein an operation of the lower layer is controlled by data stored in the register, the method comprising the steps of:

(a) transmitting/receiving a signal to/from other nodes connected to the network and generating an instruction; and (b) storing management information representing a management status of the lower layer device, wherein the management information includes first data representing a dominating node and second data concerning to a temporary management, and when the second data indicates that the dominated node is not temporarily managed by other dominating node, the dominating node having an upper layer operates as a proxy of the dominated node, wherein the dominating node generates the control signal in accordance with the instruction and writes the control signal to the register via the network, and when the second data indicates that the dominated node is temporarily managed by other dominating node, the other dominating node having an upper layer operates as a proxy of the dominated node instead of the dominating node.

21. A computer-readable medium storing a computer program to realize a communication process by one node having a layered structure consisting of at least a first lower layer having a first register, a first upper layer that manages the first lower layer and a second upper layer that manages a second lower layer of a specific dominated node connected to a network, wherein an operation of the first lower layer is controlled by data stored in the first register, the computer program comprising the instructions for:

(a) transmitting/receiving a signal to/from another node which is connected to the network and generating a first instruction and a second instruction;

(b) generating a first control signal in accordance with the first instruction received from said another node via the network;

(c) writing the first control signal to the first register to control the operation of the first lower layer;

(d) reading management information representing management status of a dominated node stored in the dominated node connected via the network; and (e) writing identification information of the one node into a storage area of the management information in the dominated node via the network when the management information does not include identification information of other dominating node, and when the identification information of the one node is written into the dominated node as a part of the management information, the one node operates as a proxy of the specific dominated node, and the communication method further comprises the step of:

(f) generating a second control signal for controlling the second lower layer of the specific dominated node in accordance with the second instruction received from said another node via the network; and (g) writing the second control signal to a second register of the second lower layer of the specific dominated node via the network to control the operation of the second lower layer.

22. A computer-readable medium according to claim 21, said computer program further comprising the instructions for:

(h) requesting permission to manage the dominated node to other dominating node when the management information includes identification information of the other dominating node, and wherein the instruction (e) writes the identification information of the one node into the dominated node when the permission from the other dominating node is received.

23. A computer-readable medium storing a computer program to realize a communication process by a dominated node connected to a network, having a layered structure consisting of at least a lower layer having a register, wherein an operation of the lower layer is controlled by data stored in the register, the program comprising the instructions for:

(a) transmitting/receiving a signal to/from other nodes connected to the network and generating an instruction; and (b) storing management information representing a management status of the lower layer device, wherein the management information includes first data representing a dominating node and second data concerning to a temporary management, and when the second data indicates that the dominated node is not temporarily managed by other dominating node, the dominating node having an upper layer operates as a proxy of the dominated node, wherein the dominating node generates the control signal in accordance with the instruction and writes the control signal to the register via the network, and when the second data indicates that the dominated node is temporarily managed by other dominating node, the other dominating node having an upper layer operates as a proxy of the dominated node instead of the dominating node.

* * * * *